(12) United States Patent
Purkayastha et al.

(10) Patent No.: US 11,377,932 B2
(45) Date of Patent: Jul. 5, 2022

(54) MACHINE LEARNING-BASED RESERVOIR RESERVES ESTIMATION

(71) Applicant: International Business Machines Corporation, Armonk, NY (US)

(72) Inventors: Sagar N. Purkayastha, Calgary (CA); Emmanuel Olumuyiwa Ibidunmoye, Calgary (CA); Moshood Omolade Saliu, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/952,576

(22) Filed: Nov. 19, 2020

(65) Prior Publication Data

US 2022/0154556 A1 May 19, 2022

(51) Int. Cl.
*E21B 43/00* (2006.01)
*G06K 9/62* (2022.01)
*E21B 47/12* (2012.01)

(52) U.S. Cl.
CPC .............. *E21B 43/00* (2013.01); *E21B 47/12* (2013.01); *G06K 9/6267* (2013.01)

(58) Field of Classification Search
CPC ........ E21B 43/00; E21B 47/12; G06K 9/6267
See application file for complete search history.

(56) References Cited

U.S. PATENT DOCUMENTS

| | | | |
|---|---|---|---|
| 8,949,173 B2 | 2/2015 | Fruehbauer et al. | |
| 8,985,205 B2 | 3/2015 | Nenniger | |
| 2018/0204139 A1 | 7/2018 | Burch et al. | |
| 2019/0332960 A1* | 10/2019 | Zheng | G06N 7/005 |
| 2019/0361146 A1* | 11/2019 | Roth | G01V 99/005 |
| 2020/0183044 A1* | 6/2020 | Doronichev | G01V 5/045 |

FOREIGN PATENT DOCUMENTS

CN 109763814 A * 5/2019

OTHER PUBLICATIONS

Anonymous, "Knowledge Base and Advisory System for Shale Gas Reservoir Development," https://priorart.ip.com/IPCOM/000208402, IP.com No. IPCOM000208402D, Jul. 6, 2011, 14 pgs.
(Continued)

*Primary Examiner* — Tarun Sinha
*Assistant Examiner* — Yossef Korang-Beheshti
(74) *Attorney, Agent, or Firm* — Kelsey M. Skodje (57) ABSTRACT

A system, method, and computer program product for reservoir reserves estimation that includes at least one processing component, at least one memory component, a well data manager, a classification module, and an estimation module. The well data manager consolidates well data for a subject well and at least one neighbor well. The classification module includes a search component that selects at least one closest neighbor well from the neighbor wells. The classification module also includes a similarity matching component that determines a log signature distance between the at least one closest neighbor well and the subject well, as well as an analog selector that selects one or more analog wells from the at least one closest neighbor well. The estimation module includes a decline estimator that generates group decline rates for the one or more analog wells and a subject decline rate based on the group decline rates.

20 Claims, 6 Drawing Sheets

(56) References Cited

OTHER PUBLICATIONS

Caers et al., "Multiple-point geostatistics: a quantitative vehicle for integrating geologic analogs into multiple reservoir models," http://mmc2.geofisica.unam.mx/cursos/geoest/Articulos/Reservoir%20Caracterization/Multiple-point%20geostatistics%20a%20quantitative%20vehicle%20for%20integrating%20geologic%20analogs%20into%20multiple%20reservoir%20models.pdf , Jan. 2, 2002, 24 pgs.

Fetkovich, M.J., "SPE 4629 Decline Curve Analysis Using Type Curves," Corpus ID: 6581379, https://pdfs.semanticscholar.org/db88/c68829dfc827f34409bc8f1945adcc56bcb9.pdf, 20092, 1 pg.

Hodgin et al., "The Selection, Application, and Misapplication of Reservoir Analogs for the Estimation of Petroluem Reserves," https://www.onepetro.org/conference-paper/SPE-102505-MS, 2006, 2 pgs.

Masoudi et al., "Net pay determination by artificial neural network: Case study on Iranian offshore oil fields," https://hal-insu.archives-ouvertes.fr/insu-01382434/document, Journal of Petroleum Science and Engineering, Elsevier, 2014, pp. 72-77.

Mell et al., "The NIST Definition of Cloud Computing," Recommendations of the National Institute of Standards and Technology, U.S. Department of Commerce, Special Publication 800-145, Sep. 2011, 7 pgs.

Mohaghegh et al., "Modeling, History Matching, Forecasting and Analysis of Shale Reservoirs performance Using Artificial Intelligence," SPE 143875, https//www.researchgate.net/publication/25434435, © 2011, Society of Petroleum Engineers, 13 pgs.

Petro Wiki, "Cold Heavy Oil Production with Sand, PetroWiki," https://petrowiki.org/Cold_heavy_oil_production_with_sand, accessed Jul. 30, 2020, 6 pgs.

PetroWiki, "CHOPS Reservoir Assessment and Candidate Screening," https://petrowiki.org/CHOPS_reservoir_assessment_and_candidate_screening , accessed Jul. 30, 2020, 10 pgs.

Purkayastha et al., "Model-Predictive-Control (MPC) of Steam Trap Subcool in Steam-Assisted-Gravity-Drainage (SAGD)," https://folk.ntnu.no/skoge/prost/proceedings/adchem2015/media/papers/0139.pdf, Preprints of the 9th International Symposium on Advanced Control of Chemical Processes, the International Federation of Automatic Control, Jun. 7-10, 2015, 6 pgs.

Schlumberger Oilfield Glossary, "Cold Heavy Oil Production with Sand," https://www.glossary.oilfield.slb.com/en/Terms/c/cold_heavy_oil_production_with_sand.aspx, accessed Jul. 30, 2020, 1 pg.

\* cited by examiner

MACHINE LEARNING-BASED RESERVOIR RESERVES ESTIMATION

BACKGROUND

The present disclosure relates to estimating reservoir oil reserves and, more specifically, to a hybrid machine-learning model for estimating a decline rate for a subject well based on aggregated behavior of automatically selected analog wells.

Heavy oil is a crude oil having a higher viscosity and density than conventional (light) crude oil. These properties often prevent heavy oil from flowing to production wells as in the case of light crude oil recovery. Therefore, various heavy oil production techniques have been developed to recover heavy oil on an industrial scale. For example, heavy oil can be recovered using a technique called Cold Heavy Oil Production with Sand (CHOPS). In CHOPS, the initial production of sand leaves channels ("wormholes") in a reservoir, increasing its relative permeability. The wormholes facilitate the flow of heavy oil through the reservoir toward the wellbore. Therefore, an estimation of the reserves remaining in a reservoir can be used to guide decision-making with regard to the operation and completion of wells.

SUMMARY

Various embodiments are directed to a system for reservoir reserves estimation that includes at least one processing component, at least one memory component, a well data manager, a classification module, and an estimation module. The well data manager consolidates well data for a subject well and at least one neighbor well. The classification module includes a search component that selects at least one closest neighbor well from the at least one neighbor well. For example, a closest neighbor well can have a geographical distance from the subject well below a threshold percentile geographical distance. The classification module also includes a similarity matching component that determines a log signature distance between the at least one closest neighbor well and the subject well, as well as an analog selector that selects one or more analog wells from the at least one closest neighbor well. The analog selector can also generate an analog score for the at least one closest neighbor well based on a weighted value of the log signature distance and a weighted value of a geographical distance between the at least one closest neighbor well and the subject well. The log signature distance can be the distance between feature vectors derived from log measurements in the well data. The estimation module includes a decline estimator that generates group decline rates for the one or more analog wells. The decline estimator also generates a subject decline rate based on the group decline rates. In some embodiments, the well data manager distributes the subject well, analog wells, and neighbor wells into bins. The decline estimator can then select a bin that contains an analog well, generate decline curves for the analog and neighbor wells in the bin, and aggregate the decline curves to generate the group decline rates. The estimation module can also include a results reporter that outputs information related to decline behavior of the subject well.

Further embodiments are directed to a method of reservoir reserves estimation, which includes consolidating well data for a subject well and at least one neighbor well, selecting at least one closest neighbor well from the at least one neighbor well, and determining a log signature distance between the at least one closest neighbor well and the subject well. The at least one closest neighbor well can be selected based on having a geographical distance from the subject well below a threshold percentile geographical distance. Determining the log signature distance can include generating feature vectors for the subject well and the at least one closest neighbor well, and determining the distance between the feature vectors. Generating the feature vectors can include extracting log measurements from the well data. The method also includes selecting one or more analog wells from the at least one closest neighbor well, generating group decline rates for the one or more analog wells. and generating a subject decline rate based on the group decline rates. Analog wells can be wells having analog scores above an analog score threshold. The analog scores can be based on a weighted value of the log signature distance and a weighted value of a geographical distance between the closest neighbor wells and the subject well. Generating the group decline rates can include distributing the subject well, analog wells, and at least one closest neighbor well into bins, selecting a bin that contains an analog well and neighbor wells, generating decline curves for the analog well and neighbor wells in each bin, and aggregating the decline curves.

Additional embodiments are directed to a computer program product for reservoir reserves estimation. The computer program product includes a computer-readable storage medium having program instructions embodied therewith, the program instructions executable by a processor to cause a device to perform a method. The method includes consolidating well data for a subject well and at least one neighbor well, selecting at least one closest neighbor well from the at least one neighbor well, and determining a log signature distance between the at least one closest neighbor well and the subject well. The at least one closest neighbor well can be selected based on having a geographical distance from the subject well below a threshold percentile geographical distance. Determining the log signature distance can include generating feature vectors for the subject well and the at least one closest neighbor well, and determining the distance between the feature vectors. The method also includes selecting one or more analog wells from the at least one closest neighbor well, generating group decline rates for the one or more analog wells. and generating a subject decline rate based on the group decline rates. Analog wells can be wells having analog scores above an analog score threshold. The analog scores can be based on a weighted value of the log signature distance and a weighted value of a geographical distance between the closest neighbor wells and the subject well. Generating the group decline rates can include distributing the subject well, analog wells, and at least one closest neighbor well into bins, selecting a bin that contains an analog well and neighbor wells, generating decline curves for the analog well and neighbor wells in each bin, and aggregating the decline curves.

DETAILED DESCRIPTION

Petroleum is extracted from crude oil, which can be recovered using wells drilled into oil reservoirs. The recovery of crude oil is reliant on the oil's ability to flow through the reservoir to the wellbore. The flow of oil is determined by factors that include the oil's viscosity and specific gravity. The American Petroleum Institute (API) scale for gravity has traditionally been used to compare crude oils based on the specific gravities of their liquid hydrocarbon components. Liquid hydrocarbons with lower specific gravities are found in crude oils with higher API gravities (° API). Oil obtained from oil reservoirs using conventional techniques is primarily light crude oil (e.g., oil having an ° API greater than 30) because heavier oils do not flow toward a wellbore as easily.

More recently, techniques have been developed for recovering heavy oil (e.g., crude oil having an ° API below about 22 and a viscosity above about 500 cP) by facilitating its flow toward a wellbore. One of these techniques is Cold Heavy Oil Production with Sand (CHOPS), which can be used to recover heavy oil from reservoirs containing unconsolidated sandstone. CHOPS recovery involves the production of sand, which leaves behind high permeability channels called wormholes in the reservoir. Heavy oil can then flow through these wormholes, allowing it to reach the wellbore. However, it is difficult to model and predict the growth of wormholes. This causes significant uncertainty in estimates of reserves or recoverable reserves in reservoirs for CHOPS wells.

The ability to estimate the recoverable reserves prior to operation and/or completion of a well allows well operators to determine whether heavy oil recovery from a given reservoir is viable from an economic standpoint. Traditionally, reserve estimates for CHOPS wells have relied upon comparisons between a given well ("subject well") and wells with similar geological and petrophysical signatures ("analog wells") from the same reservoir pool. That is, the heavy oil production behavior of a subject well is predicted based on the behavior of analog wells from the same reservoir pool.

However, selection of analog wells and modeling production behavior based on the analog wells is a challenging task. For example, current techniques for selecting analog wells require large volumes of data from multiple sources (e.g., production history, well logs, completion records, etc.) to be evaluated by subject matter experts. There are a number of steps involved in selecting analog wells and estimating reserves for a subject well. First, a subject well and its geological member or sub-member are specified. Continuous pay intervals within the geological sub-member of the subject well are then identified, as well as geological pools with which the subject well intersects. Potential analog wells within a certain distance (e.g., 3000 m) from the subject well in the same pool are then selected. The geological well logs (e.g., Gamma Ray (GR) log, Density Porosity of Sandstone (DPSS) log, Deep Resistivity (RESD) log, Photoelectric Factor (PEF) log, etc.) of these potential analog wells are compared with those of the subject well. Analog wells are selected from the potential analog wells based on having log characteristics similar to those of the subject well.

The drainage radius of each analog well is then estimated, and its production curve is extended to the economic limit. A type curve is then created based on the extended production curves of the analog wells. The type curve is weighted based on the drainage radii of the analog wells. The type curve and a point of decline determined for the subject well's estimated reserves are then used to forecast production of the subject well. The production forecast is used to estimate the ultimate recoverable reserves or remaining reserves. However, carrying out these steps manually requires multiple geologists, engineers, or other subject matter experts. Subjectivity and differing methods and interpretations used by the inspectors lead to errors and biases in comparing and selecting analog wells. Therefore, recoverable reserves often cannot be estimated for a subject well without using an impractical amount of time and resources.

Further, current techniques for automated analog selection are constrained by limited amounts of data and overly simplified reserve estimates that are not suited to CHOPS oil recovery. For example, supervised machine learning approaches for analog selection are inhibited by a lack of ground-truth labels of correct offsets or analogs for a significant number of wells. Measurements of Euclidian distance between series of well data suffer from the presence of outliers, missing data points, disregard for temporality, and an equal-length constraint. While Dynamic Time Warping (DTW) relaxes the equal-length constraint, it assumes that well logs have no missing measurements, which is extremely difficult to satisfy for the majority of well logs. Additionally, existing reserves estimation techniques are based on production forecasting, which does not take into account decline behavior of a well, such as loss of reservoir pressure over time. Another limitation of current reserve estimation techniques is that the reliance on historical data excludes wells without existing production data.

Disclosed herein are techniques for automatically estimating heavy oil reserves for a given well and geological member. The disclosed techniques use hybrid machine-learning algorithms to combine physics-based modeling, historical data (e.g., production history, well log data, etc.) from analog wells, and experiential knowledge of subject matter experts (e.g., engineers and geologists) in order to estimate the reserves of a given subject well. The analog wells are selected by an analog classification process that uses geological and geographical proximity to the subject well. Geological proximity is determined based on distances between vectors derived from the wells' log data. The reserves of the subject well are then estimated based on fluid behavior of the analog wells. The disclosed approaches assume that oil production will decline with respect to time due to loss of reservoir pressure and diffusive transport of oil towards the wellbore, and that the decline behavior will follow an exponential pattern.

Figure 1:
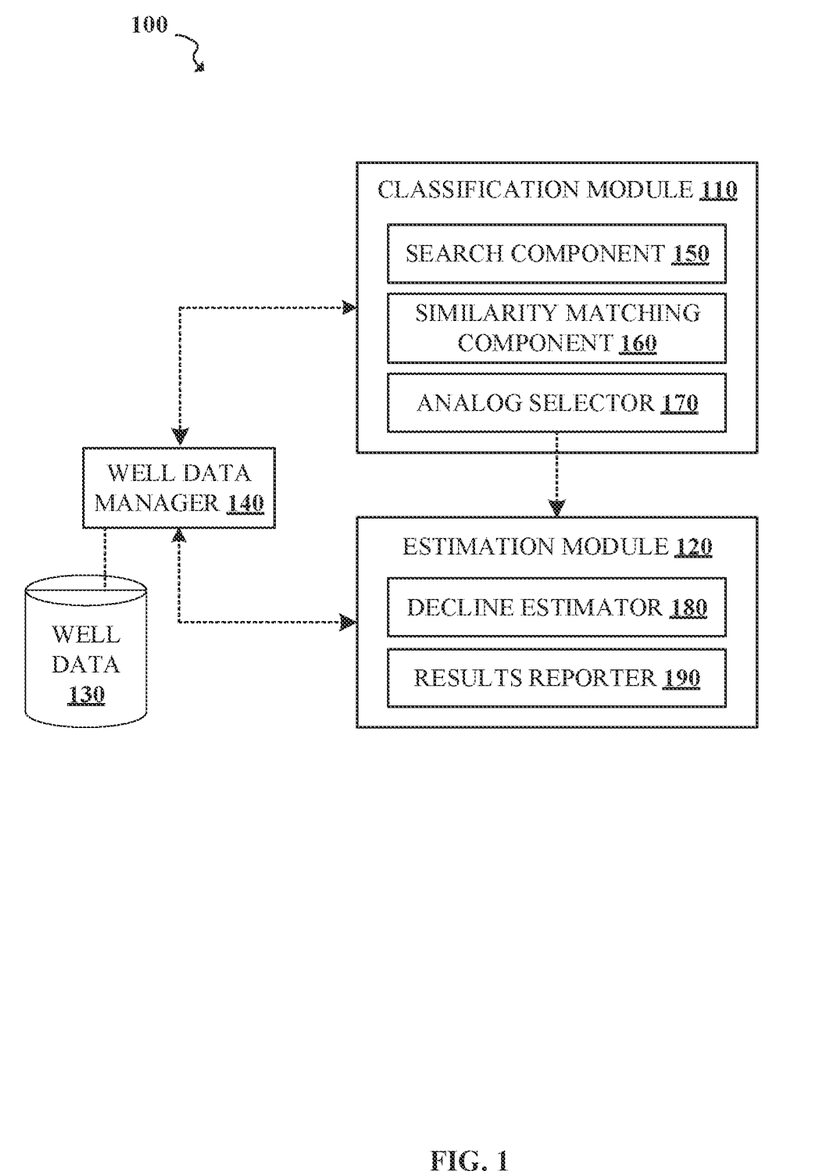
FIG. 1 is a block diagram illustrating a reservoir reserves estimation environment, according to some embodiments of the present disclosure.

FIG. 1 is a block diagram illustrating a reservoir reserves estimation environment 100, according to some embodiments of the present disclosure. The reservoir reserves estimation environment 100 includes a classification module 110, an estimation module 120, well data 130, and a well data manager 140. The classification module 110 includes a search component 150, a similarity matching component 160, and an analog selector 170. The estimation module 120 includes a decline estimator 180 and a results reporter 190.

The well data 130 comes from at least one data source (not shown) related to petroleum reserves for CHOPS oil wells, and is consolidated by the well data manager 140. The well data manager 140 can combine well data 130 from a variety of sources (e.g., geographical coordinates, survey information, digital well logs, production histories, stratigraphic well sections, etc.) in order to generate geological and production profiles for one or more wells in a given region. Each well has a unique well identifier (UWI) mapped to a profile in the well data 130. The profile of each well identifies information such as its corresponding production entity, monthly production, geolocation, log measurements, etc. Additional well data 130 that can be mapped to UWIs can include directional survey data, stratigraphic well sections, well licenses, completion data, etc.

Wells in a given geographical region of interest (e.g., a geological member, sub-member, pool, etc.) that share a first year of production are distributed into bins by the well data manager 140. The wells are distributed based on well data 130 from their profiles so that bins contain wells with similar properties. In particular, a given bin can contain a group of wells predicted to exhibit similar decline behavior. For example, wells can be distributed into bins based on well data 130 such as first year of production, geological member, geographical meridian (e.g., W3 or W4), and quadrant (e.g., NORTH or SOUTH). Therefore, wells in a given bin can be assumed to exhibit similar decline behavior. In some embodiments, each well in the geographical region can be added to a bin. In other embodiments, the data manager 140 generates bins for analog wells and wells with similar properties to the analogs. The selection of analog wells is discussed in greater detail below.

The search component 150 receives an input UWI for a subject well. The subject well is a well for which reserves are to be estimated. The reserves are estimated based on well data 130 from analog wells ("analogs") of the subject well, and the analogs are selected from a set of neighbor wells. The neighbor wells are wells having existing perforations in the same geological member as the subject well. A member is a lithologically distinct portion of the subsurface. The neighbor wells are located by the search component 150. For example, the search component 150 can carry out a proximity search of the well data 130 to generate a neighbor set containing UWIs for all of the neighbor wells. The neighbor set can be organized into a tree structure that partitions the UWI nodes into a number of nested hyperspheres ("balls"). For example, the well data manager 140 can partition the neighbor UWIs based on the geographical distance ("geo-distance") of each well from the subject well. Each ball in the tree structure contains UWIs for wells at given geo-distances. The search component 150 can then use a nearest neighbor query to generate a closest neighbor set containing UWIs for all neighbor wells at geo-distances within a given radius of the subject well. Techniques for generating the neighbor set and closest neighbor set are discussed in greater detail with respect to FIG. 2A.

The similarity matching component 160 extracts geological log features corresponding to the subject well and the wells of the closest neighbor set. For each well, the similarity matching component 160 can extract a window of measurements from at least one geological log (e.g., a GR log, a DPSS log, a RESD log, a PEF log, etc.) along a depth interval of the geological member. The depth interval can be defined in a stratigraphic well section record for the member. The extracted log windows are univariate sequences (depth series) of observed measurements ordered with respect to depth. For a subject well and its analogs the similarity matching component 160 can extract a sequence of measurements for windows from each log.

The similarity matching component 160 can then derive at least one feature vector for each of the extracted log windows. The feature vectors contain numerical features that are computed from measurements in the extracted log windows. For example, each extracted log window can have feature vectors for mean, autocorrelation, entropy, etc. In instances where the wells have extracted windows from more than one log, feature vectors from each log can be concatenated into single feature vectors. For example, each well can have a feature vector containing the autocorrelation values from its extracted log windows, a feature vector containing entropy values from its extracted log windows, etc. The feature vectors can be saved in the well data 130.

The similarity matching component 160 then compares the feature vectors of the closest neighbor wells with the feature vectors of the subject well in order to determine the similarity between their geological signatures. For example, the similarity matching component 160 can use a tree-based nearest neighbor algorithm to determine the distance between a feature vector of the subject well and feature vectors of the closest neighbor wells in n-dimensional space ("log signature distances"). The closest neighbor wells can be ranked according to similarity based on the log signature distances. Techniques for determining geological similarity based on log feature vectors are discussed in greater detail with respect to FIG. 2A.

The analog selector 170 gives analog scores to potential analog wells from the closest neighbor wells. In some embodiments, each of the closest neighbor wells is considered a potential analog of the subject well, and is therefore given an analog score. However, there may also be closest neighbor wells that are not considered potential analogs. For example, closest neighbor wells with normalized geo-distances above a percentile threshold (e.g., 95%) and/or normalized log geological signature similarities below a percentile threshold (e.g., 5%) can be dismissed from the set of potential analogs by the analog selector 170 in some embodiments.

The analog scores are based on weighted values of normalized log signature distance and normalized geo-distance. For example, the analog selector 170 can use tunable hyperparameters to apply different weights to the normalized geo-distance and the normalized log signature distance of the potential analogs. This is discussed in greater detail with respect to FIG. 2A. The analog selector 170 then classifies wells as analogs of the subject well based on their analog scores. For example, the analog selector 170 can classify potential analogs having analog scores above a threshold score as analog wells.

The estimation module 120 uses well data 130 corresponding to the subject well and the analog wells to estimate the subject well's reserves. The reserves remaining in the subject well at a given time are estimated based on forecasted decline behavior of the subject well, which is determined by the decline estimator 180. The decline estimator 180 locates, in the well data 130, bins containing the analog wells. Each bin can also contain at least one neighbor well. This is discussed in greater detail above. A group decline curve (type curve) is generated for each bin containing an analog well. Each well in a given bin can have a decline curve based on its production history. The group decline curve of a given bin can then be generated by averaging the decline curves of the wells in the bin. The decline estimator 180 uses the group decline curves to generate a group decline rate for each bin. This is discussed in greater detail with respect to FIG. 2B.

The decline estimator 180 develops an ensemble weighted decline model to forecast the decline behavior of the subject well as a function of the group decline curves of the analog wells. The weighted decline model takes into account the draining effect that analog wells can have on the reservoir of the subject well, as well as the potential of the analog wells to approximate the decline behavior of the subject well. The decline behavior of the subject well is predicted based on an estimated decline rate for the subject well ("subject decline rate"). Techniques for determining a subject decline rate based on group decline rates of bins containing its analog wells are discussed in greater detail with respect to FIG. 2B.

The decline estimator 180 can use a decline point parameter to determine an initial production rate of the subject well from which to predict future reserves. If the subject well has a production history, a tail decline model can be used. The tail decline model declines from a tail (e.g., the preceding m months) of the production curve of the subject well by setting the decline point parameter as the production rate at a given number of production hours (e.g., at least 600 hours of production per month). If the subject well does not have a production history (e.g., when the subject well is a newly perforated well), a peak decline model can be used. The peak decline model sets the decline point parameter as the estimated global maximum of a group decline curve for the bin containing the subject well.

The decline estimator 180 then uses the subject decline rate and appropriate decline point parameter to forecast the subject decline behavior until the forecast volume of the reserves for the subject well reaches zero. Information about the subject decline behavior such as technical volume (TVol), expected ultimate recovery (EUR), EUR remaining recoverable (EUR-RR), net pay, and support can be output by the results reporter 190 through a user interface (not shown). These values are discussed in greater detail with respect to FIG. 2B. The data manager 140 can also consolidate the information about the subject decline behavior, and add it to the subject well profile in the well data 130.

Figure 2A:
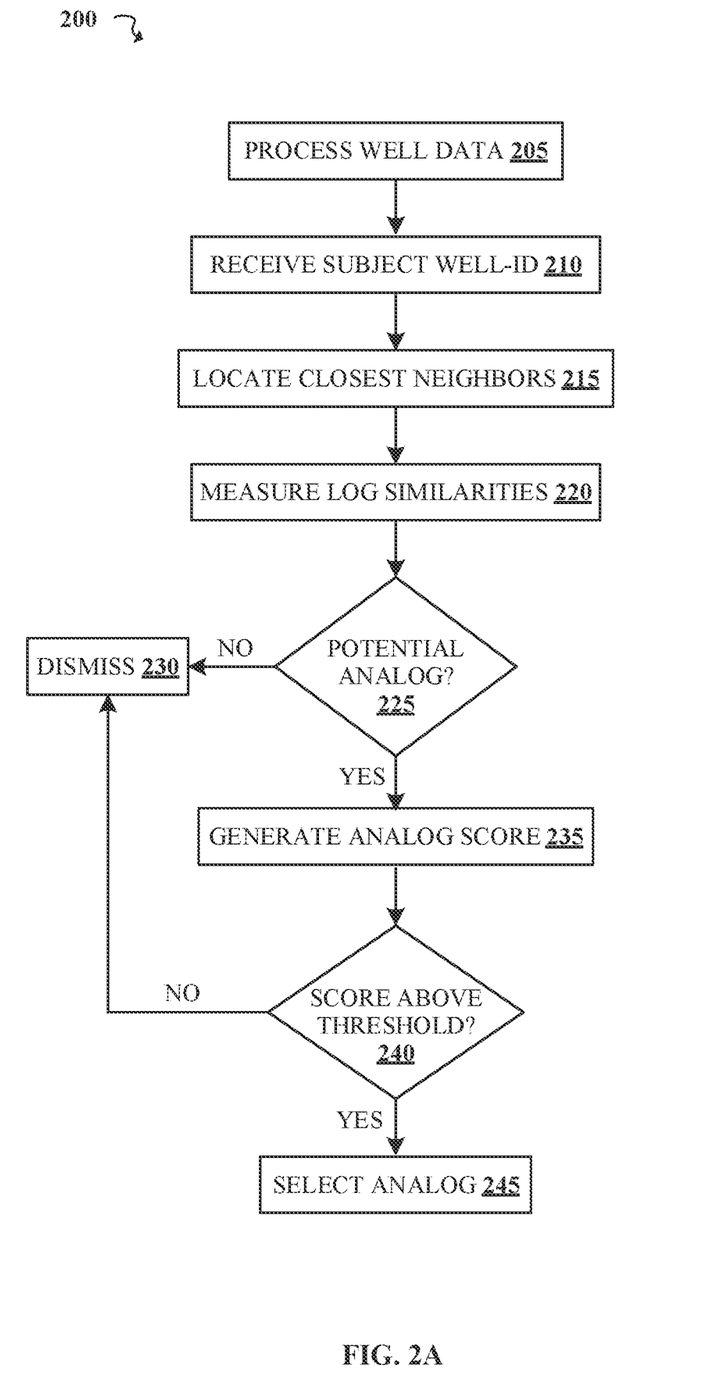
FIG. 2A is a flow diagram illustrating a process of analog well classification for a subject well, according to some embodiments of the present disclosure.

FIG. 2A is a flow diagram illustrating a process 200 of analog well classification for a subject well, according to some embodiments of the present disclosure. To illustrate process 200, but not to limit embodiments, FIG. 2A is described within the context of the automatic reserve estimation environment 100 of FIG. 1. Where elements referred to in FIG. 2A are identical to elements shown in FIG. 1, the same reference numbers are used in both Figures.

Data corresponding to wells in a given geographical area is processed. This is illustrated at operation 205. The well data manager 140 can consolidate this well data 130 from a variety of sources in order to generate geological, petrophysical, and production profiles for the wells in the geographical area. The profiles are mapped to the UWIs of these wells. Each profile can also identify a well's production entity, monthly production, geolocation, directional survey data, stratigraphic well sections, well licenses, completion data, etc. The data processing can also include distributing the wells into bins based on properties related to decline rates (e.g., first year of production, geological member, geographical meridian (e.g., W3 or W4), and quadrant (e.g., NORTH or SOUTH)) so that each bin contains wells predicted to exhibit similar decline behavior.

An input UWI for a subject well is received. This is illustrated at operation 210. The subject well is a well for which reserves are to be estimated. The subject UWI ($W_{subject}$) is a unique identifier for this well. Data corresponding to the subject well is mapped to the subject UWI in the well data 130. This data includes information about the subject well's location, production history, digital logs, stratigraphic well section, etc. The data also identifies a geological unit of the subject well. The geological unit can be a member, which is a lithologically distinct portion of the subsurface. In some embodiments, geological units other than a member (e.g., a group, a formation, a bed, etc.) can be identified as well.

Closest neighbor wells of the subject well are located. This is illustrated at operation 215. The closest neighbor wells are selected from a set of neighbor wells generated by the search component 150. Neighbor wells are wells having existing perforations in the same geological member A/subject as the subject well. The search component 150 can carry out a proximity search to generate a neighbor set $S=\{w_i\}_{i=1}^{N}$, where $w_i$ represents the UWIs for all neighbor wells. The neighbor set S can be organized into a tree structure that partitions the UWI nodes into a number of nested hyperspheres ("balls"). The partitioning can be based on the geo-distance $d_{geo}$ of each well w from the subject well $W_{subject}$. The geo-distances can be determined based on geological coordinates (e.g., latitude and longitude). Each ball in the tree structure contains UWIs for wells at similar geo-distances (e.g., $d_{geo}$ values within predetermined ranges or radii). The search component 150 can then use a nearest neighbor query to locate all neighbor wells in the set S that are within a given radius r of the subject well. The nearest neighbor query outputs a closest neighbor set of UWI and geo-distance pairs $S'=\{(w, d_{geo})_i\}_{i=1}^{n}$, $n \leq N$ for the neighbor wells within the radius. The closest neighbor wells may all be in the same ball in the tree structure, although there can be multiple balls within the given radius.

Geological similarities between the subject well and the closest neighbor wells are measured. This is illustrated at operation 220. The similarity matching component 160 extracts log features from the subject well $W_{subject}$ and the wells of the closest neighbor set S'. For a given well, the similarity matching component 160 can extract a window of measurements from a geological log (e.g., a GR log, a DPSS log, RESD log, a PEF log, etc.) along the depth interval of the corresponding geological member $M_{subject}$. The depth interval can be bounded by a top depth DT and a base depth $D_B$, which can be defined in a stratigraphic well section record for the member. The extracted log window is a univariate sequence (depth series) $X=\{x_i\}_{i=D_T+1}^{D_B}$, where $x_i$ is a log measurement at depth i, of observed log measurements ordered with respect to depth. The similarity matching component can extract a sequence of measurements for extracted windows from each log.

The similarity matching component 160 can then derive feature vectors representing inherent geological signatures for the extracted windows. For example, a feature vector X' can contain a numerical feature (e.g., mean, autocorrelation, entropy, etc.) computed using measurements from the window series X. Each well can have more than one feature vector for an extracted log window. Additionally, when each well has more than one extracted log window, there can be at least one feature vector for each window. For each well, the feature vectors derived from the extracted measurements from different logs are concatenated into a single feature vector $X_f$ of length $n_f \times n_l$, where $n_f$ is the length of each log's feature vector and $n_l$ is the number of logs.

The similarity matching component 160 determines the similarity between the geological signatures of the subject well and the geological signatures of the closest neighbor wells based on their respective feature vectors. For example, a feature vector $X_f$ for the subject well and a feature vector $Y_f$ for a given closest neighbor well can be compared. The similarity matching component 160 can use a tree-based nearest neighbor algorithm to learn the similarities between the geological signatures of the subject and neighbor wells as a function $f$ mapping the input pair $(X_f, Y_f)$ to a real value $d_{sim}$ that measures the distance between the two feature vectors in n-dimensional space (log signature distance). The similarity matching component 160 can calculate $d_{sim}$ values for each of the closest neighbor wells. The closest neighbor wells can be ranked according to similarity based on their normalized $d_{sim}$ and $d_{geo}$ values. Larger normalized $d_{sim}$ values represent fewer geological signature similarities (greater log signature distances), and larger normalized $d_{geo}$ values indicate greater geo-di stances.

It is determined whether closest neighbor wells are potential analogs of the subject well. This is illustrated at operation 225. In some embodiments, the analog selector 170 determines that closest neighbor wells where the normalized $d_{geo}$ values represent geographical distances above a predetermined threshold (e.g., a geo-distance above the $95^{th}$ percentile) are not potential analogs. The analog selector 170 can also determine that closest neighbor wells where the normalized $d_{sim}$ values represent geological signature similarities below a predetermined threshold (e.g., a geological signature similarity below the $5^{th}$ percentile) are not potential analogs. Closest neighbor wells that are not considered potential analogs are dismissed by the analog selector 170. This is illustrated at operation 230. The remaining closest neighbor wells are determined to be potential analogs. In other embodiments, all of the closest neighbor wells in the set S' generated at operation 210 are considered potential analogs.

Each potential analog well is given an analog score. This is illustrated at operation 235. The analog selector 170 calculates a weighted analog score $s=\alpha \cdot d_{geo}+\beta \cdot d_{sim}$ that uses tunable hyperparameters $\alpha$ and $\beta$ to weight the normalized geo-distance $d_{geo}$ and normalized log signature distance $d_{sim}$ of a given potential analog well. These weights can be preset or user selected. For example, a given subject well can have two potential analog wells (Well 1 and Well 2). Wells 1 and 2 can have respective distances of 515.01 m and 1702.66 m from the subject well. Well 1 can have a normalized $d_{geo}$ value of 0.69 and normalized $d_{sim}$ value of 0.28. Well 2 can have a normalized $d_{geo}$ value of 0.02 and normalized $d_{sim}$ value of 0.49. If the geo-distance weight ($\alpha$) is 80% and the log similarity weight ($\beta$) is 20%, the analog score of Well 1 will be 0.61 and the analog score of Well 2 will be 0.12.

It is then determined whether each analog score is above an analog score threshold. This is illustrated at operation 240. The analog selector 170 can apply a percentile threshold p over the analog score distribution so that closest neighbor wells with weighted analog scores over the $p^{th}$ percentile score are classified as analogs of the subject well. This is illustrated at operation 245. However, if a potential analog well has an analog score below the analog score threshold (e.g., the percentile threshold p), process 200 can return to operation 230, whereupon the analog selector 170 dismisses the potential analog well. Continuing the example from operation 230, if the percentile threshold p is greater than 12% and less than 61% (e.g., p=30%), Well 1 will be selected as an analog of the subject well, and Well 2 will not. Wells selected as analogs at operation 240 can be used to estimate the subject well's reserves in process 201 (FIG. 2B).

Figure 2B:
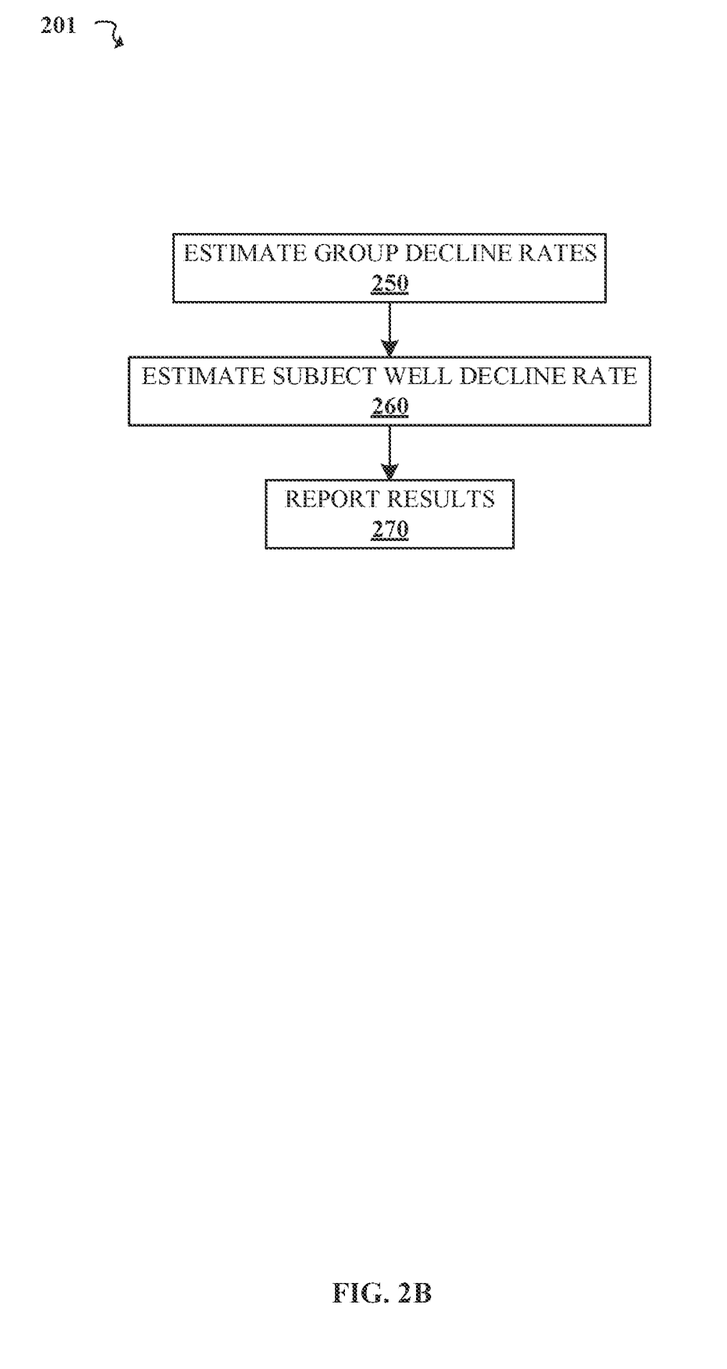
FIG. 2B is a flow diagram illustrating a process of estimating reservoir reserves for a subject well, according to some embodiments of the present disclosure.

FIG. 2B is a flow diagram illustrating a process 201 of estimating reservoir reserves for a subject well, according to some embodiments of the present disclosure. To illustrate process 201, but not to limit embodiments, FIG. 2B is described within the context of the automatic reserve estimation environment 100 of FIG. 1 and the analog classification process 200 of FIG. 2A. Where elements referred to in FIG. 2B are identical to elements shown in FIGS. 1 and 2A, the same reference numbers are used in both Figures.

Group decline rates are determined for the analog wells selected in process 200 (FIG. 2A). This is illustrated at operation 250. The group decline rates are estimated based on well data 130 for the analog wells and wells sharing bins with the analog wells. The forecasted decline behavior of each well is assumed to follow an exponential decline model represented by Equation (Eq.) 1:

$$Q_t = Q_0 e^{-at} \qquad (1)$$

where $Q_0$ is a peak production rate from a historical production curve, a is a decline parameter estimated for the associated production profile, and $Q_t$ is a decline value estimated at time t.

The decline estimator 180 locates bins containing the analog wells, and determines a group decline curve for analog wells in each bin. The production histories of all wells in each bin are normalized from calendar date scales to age scales (e.g., in months). An aggregated production profile for each bin can then be generated by averaging the decline curves of wells in the same bins. The decline estimator 180 can then learn the group decline rates for the bins from the group decline curves of their wells by linearizing the exponential decline model in Eq. 1, resulting in Eq. 2:

$$\ln q = Bt + \epsilon \qquad (2)$$

where $$q = \frac{Q_t}{Q_0}, B = -a,$$

and $\epsilon$ is an error term. The decline estimator 180 can learn the decline parameter B via curve fitting using an Ordinary Least Square (OLS) algorithm. The values of q and t can be known at any time t over the length of a production curve. Therefore, the OLS model can be used to determine the values of B and $\epsilon$ for a group decline curve $Q=\{q_t\}_{t=1}^T$ by selecting optimal values for minimizing the sum of the squared error between $y=\ln q$ and $\hat{y}=Bt+\epsilon$ from candidate values of B and $\epsilon$. In Eq. 1, the group decline rate for a given bin therefore becomes $a=-B$.

The subject well decline rate is then estimated. This is illustrated at operation 260. The decline estimator 180 then generates a decline curve for the subject well. An ensemble weighted decline model is developed to account for the draining effect that analog wells can have on the reservoir of the subject well, as well as the potential of the analog wells to approximate the decline behavior of the subject well. The weighted decline model forecasts the decline behavior of the subject well as a function of the group decline curves of the analog wells. This is illustrated in Eq. 3, wherein the subject decline rate $Q_t^{ref}$ is governed by the group decline rates estimated (Eq. 2) for the bins containing analog wells:

$$Q_{(r)}^{Ref} = \frac{Q_*^{ref}}{n} \sum_{i=1}^{N} e^{-a_i \beta_i t} \quad (3)$$

$$n \leq N$$

$\beta_i = 1 \forall \text{distance} > z \text{ meter}$ where $a_i$ is the group decline parameter for the bin of a given analog i, $\beta_i$ is the inverse of the normalized geo-distance of the analog i to the subject well, N is the total number of selected analogs, z is a tunable radius parameter, and $Q_*^{ref}$ is a decline point parameter.

The decline estimator 180 can use the decline point parameter $Q_*^{ref}$ to determine an initial production rate with which to offset the forecast subject reserves. The decline point parameter can be determined based on a tail decline model or a peak decline model. If the subject well has a production history, the tail decline model can be used to determine the decline point parameter ($Q_{tail}^{ref}$). The tail decline model declines from a tail (e.g., the preceding m months) of the production curve of the subject well by setting $Q_{tail}^{ref}$ as the production rate at a given number of production hours (e.g., at least 600 hours of production per month). If the subject well does not have a production history, the peak decline model can be used to determine the decline point parameter ($Q_{peak}^{ref}$). The peak decline model is based on the group decline curve of the bin containing the subject well, setting the decline point parameter $Q_{peak}^{ref}$ as the estimated global maximum of the group decline curve. The decline estimator 180 can then use Eq. 3 with the appropriate decline point parameter $Q_{tail}^{ref}$ or $Q_{peak}^{ref}$ to iteratively forecast the subject decline behavior until the forecast volume of the subject reserves reaches zero.

Results that can inform users and guide decision-making with regard to well operation and completion are then reported. This is illustrated at operation 270. Information about the subject decline behavior can be output by the results reporter 190 via a user interface (not shown). The data manager 140 can also consolidate the information output by the results reporter 190, and add it to the well data 130 where it can be mapped to the subject well (e.g., at operation 205 of process 200). The results reporter 190 can output information such as the values discussed above (e.g., $d_{sim}$ and $d_{geo}$ values, geological similarity and geo-distance percentiles, estimated decline curves and rates, etc.).

The information about the subject decline behavior output by the results reporter 190 can also include TVol, EUR, and EUR-RR. Various techniques can be used to determine these values for subject wells with production histories. For example, TVol can be the sum of the production curve and the subject decline curve estimate up to 0 m³ per day. EUR can be the sum of the production curve and the subject decline curve estimate up to the economic limit. EUR-RR can be the sum of the decline curve estimate up to the economic limit. Additional techniques can be used to determine TVol, EUR, and EUR-RR for subject wells without production histories. For example, TVol can be derived as the sum of the ramp up period of the group decline curve and the estimated subject decline curve up to the economic limit. EUR can be the sum of the ramp up period of the group production curve and the subject decline curve estimate up to the economic limit. EUR-RR can be the same as EUR for wells without production histories.

The results reporter 190 can also output the net pay of subject wells with sufficient log data. Pay zones can be used to determine net pay. Pay zones are regions of a reservoir containing economically recoverable oil, or continuous depth intervals that meet fluid-flow cutoffs (e.g., minimum flow values). Net pay refers to pay zones that meet criteria for properties such as porosity, permeability, and hydrocarbon saturation. The sum of all pay zone thicknesses can be reported in meters, and can be used as a filter when prioritizing wells for optimization.

Additional information that can be output by the results reporter 190 can include support. Support is a confidence measure defined as the probability that a well in the same bin as the subject well has an EUR value greater than or equal to the estimated EUR. For example, there can be an estimated EUR e for a given subject well s in a bin b. The support for this subject well can be the percentage of wells in b having EUR values greater than or equal to e. Support can offer an evidential way to measure the reasonableness of estimated reserves for a subject well.

Figure 3:
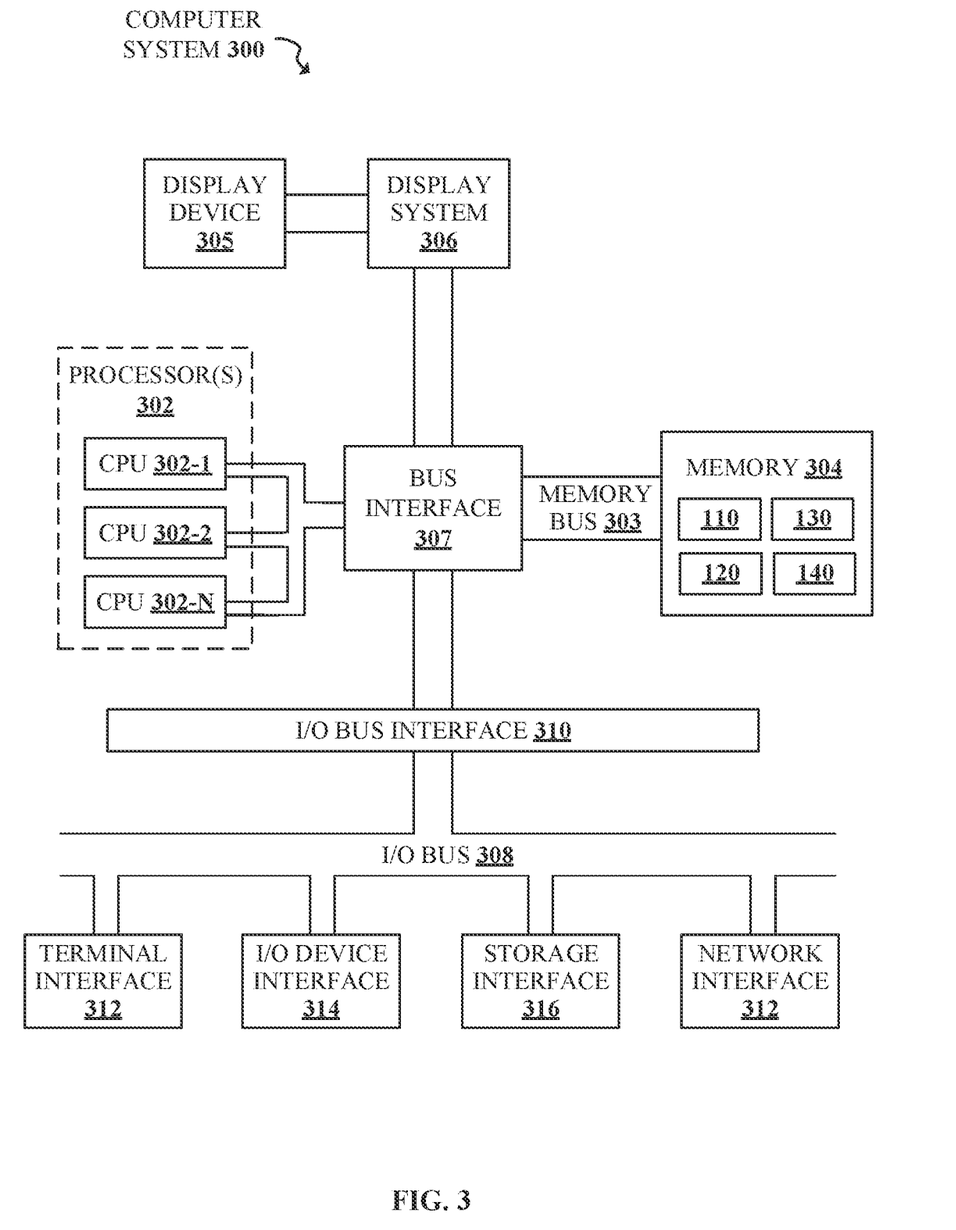
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The classification module 110, estimation module 120, well data 130, and well data manager 140 (FIG. 1) are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the classification module 110, estimation module 120, well data 130, and well data manager 140 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the classification module 110, estimation module 120, well data 130, and well data manager 140 include instructions that execute on the processor 302 or instructions that are interpreted by instructions that execute on the processor 302 to carry out the functions as further described in this disclosure. In another embodiment, the classification module 110, estimation module 120, well data 130, and well data manager 140 are implemented in hardware via semiconductor devices, chips, logical gates, circuits, circuit cards, and/or other physical hardware devices in lieu of, or in addition to, a processor-based system. In another embodiment, the classification module 110, estimation module 120, well data 130, and well data manager 140 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
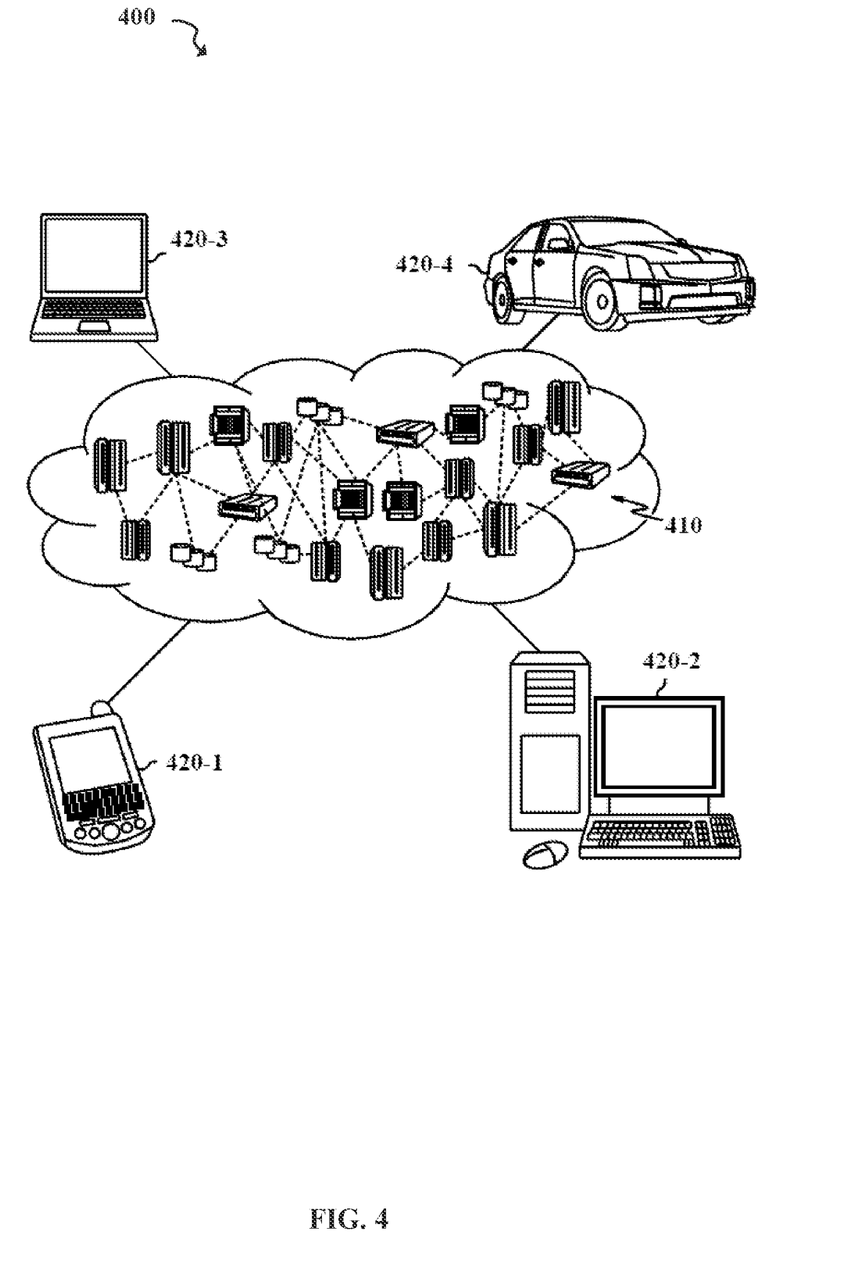
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
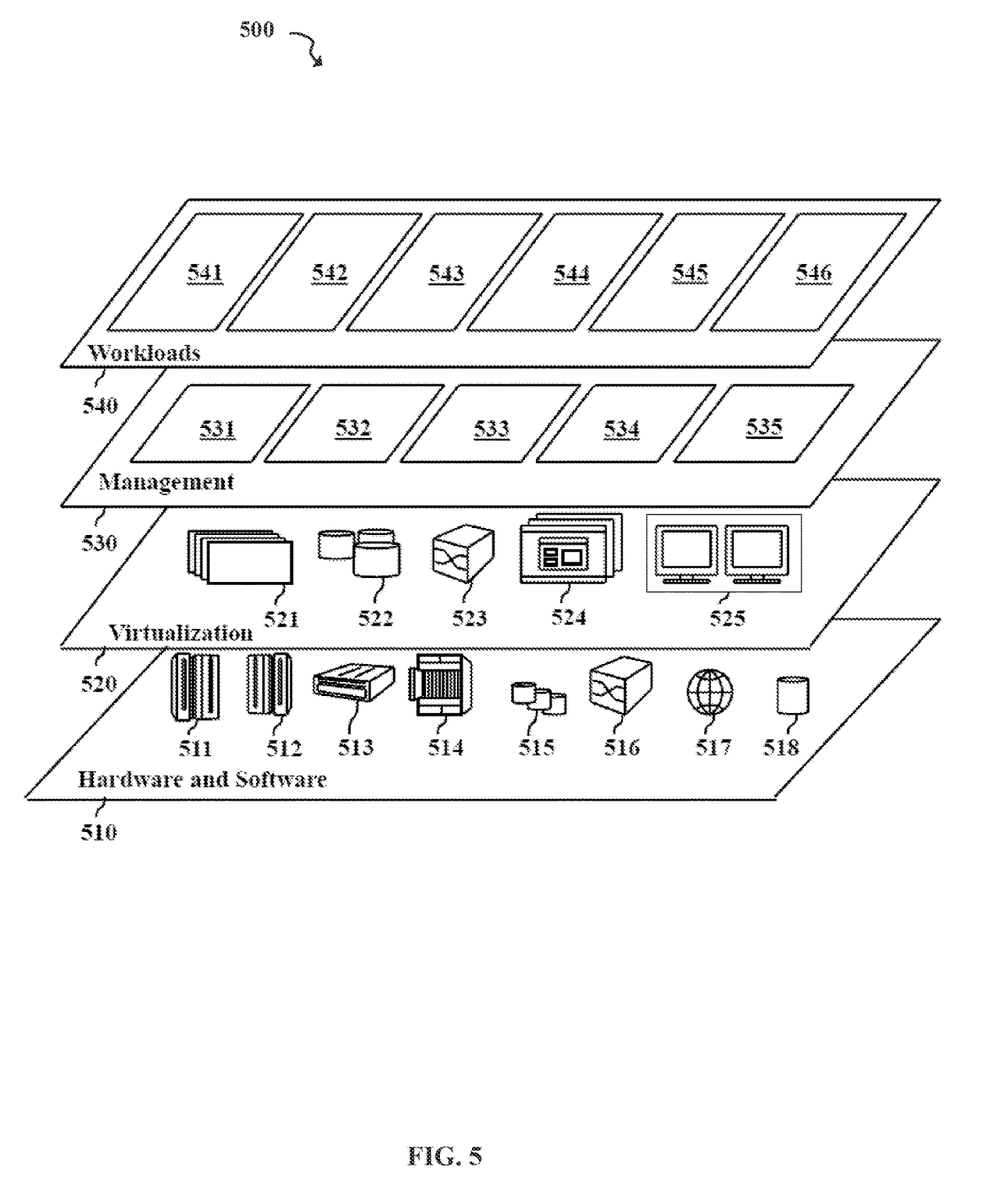
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and reservoir reserve estimation 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system for reservoir reserves estimation, comprising:
a memory;
a processor communicatively coupled to the memory, wherein the processor is configured to:
consolidate well data for a group of wells;
select a subject well and at least one neighbor well from the group of wells;
select at least one closest neighbor well from the at least one neighbor well;
determine, for the at least one closest neighbor well, a log signature distance from the subject well;
determine, for the at least one closest neighbor well, a geographical distance from the subject well; and
generate an analog score based on a weighted value of the log signature distance and a weighted value of the geographical distance;
select, based on the analog score, one or more analog wells from the at least one closest neighbor well;
generate group decline rates for the one or more analog wells; and
generate a subject decline rate for the subject well based on the group decline rates.

2. The system of claim 1, wherein the processor is further configured to distribute the group of wells into bins.

3. The system of claim 2, wherein the processor is further configured to:
select, from the bins, a bin containing an analog well from the one or more analog wells and at least one additional well;
generate decline curves for the analog well and the at least one additional well; and
aggregate the decline curves to generate the group decline rates.

4. The system of claim 1, wherein the geographical distance from the subject well is below a threshold percentile geographical distance.

5. The system of claim 1, wherein the processor is further configured to output information related to decline behavior of the subject well.

6. The system of claim 1, wherein the log signature distance is a distance between feature vectors derived from log measurements in the well data.

7. A method of reservoir reserves estimation, comprising:
consolidating well data for a group of wells;
selecting a subject well and at least one neighbor well from the group of wells;
selecting at least one closest neighbor well from the at least one neighbor well;
determining, for the at least one closest neighbor well, a log signature distance from the subject well and a geographical distance from the subject well;
generating an analog score based on a weighted value of the log signature distance and a weighted value of the geographical distance;
selecting, based on the analog score, one or more analog wells from the at least one closest neighbor well;
generating group decline rates for the one or more analog wells; and
generating a subject decline rate for the subject well based on the group decline rates.

8. The method of claim 7, wherein the generating the group decline rates comprises:
distributing the group of wells into bins;
selecting, from the bins, a bin containing an analog well from the one or more analog wells and at least one additional well;
generating decline curves for the analog well and the at least one additional well; and
aggregating the decline curves.

9. The method of claim 7, wherein the geographical distance is below a threshold percentile geographical distance.

10. The method of claim 7, wherein the determining the log signature distance comprises:
generating a feature vector for the subject well;
generating a feature vector for the at least one closest neighbor well; and
determining a distance between the feature vector for the subject well and the feature vector for the at least one closest neighbor well.

11. The method of claim 10, wherein the generating the feature vector for the subject well comprises extracting at least one series of log measurements from the well data for the subject well.

12. A computer program product for reservoir reserves estimation, the computer program product comprising a computer readable storage medium having program instructions embodied therewith, the program instructions executable by a processor to cause a device to perform a method, the method comprising:
consolidating well data for a group of wells;
selecting a subject well and at least one neighbor well from the group of wells;
selecting at least one closest neighbor well from the at least one neighbor well;
determining, for the at least one closest neighbor well, a log signature distance from the subject well;
determining, for the at least one closest neighbor well, a geographical distance from the subject well;
generating an analog score based on a weighted value of the log signature distance and a weighted value of the geographical distance;
selecting, based on the analog score, one or more analog wells from the at least one closest neighbor well;
generating group decline rates for the one or more analog wells; and
generating a subject decline rate for the subject well based on the group decline rates.

13. The computer program product of claim 12, wherein the generating the group decline rates comprises:
distributing the group of wells into bins;
selecting, from the bins, a bin containing an analog well from the one or more analog wells and at least one additional well;
generating decline curves for the analog well and the at least one additional well; and
aggregating the decline curves.

14. The computer program product of claim 12, wherein the geographical distance is below a threshold percentile geographical distance.

15. The computer program product of claim 12, wherein the determining the log signature distance comprises:
generating a feature vector for the subject well;
generating a feature vector for the at least one closest neighbor well; and determining a distance between the feature vector for the subject well and the feature vector for the at least one closest neighbor well.

16. The method of claim 7, wherein the at least one neighbor well has an existing perforation in a geological member mapped to an identifier of the subject well.

17. The method of claim 11, wherein the at least one series of log measurements comprises geological log measurements ordered with respect to depth.

18. The method of claim 8, wherein the distributing is based on properties related to decline rates.

19. The method of claim 7, wherein when the subject well does not have a production history, a peak decline model is used to determine an initial production rate.

20. The system of claim 6, wherein the log measurements are ordered with respect to depth.

* * * * *